United States Patent [19]
Inoue

[11] Patent Number: 5,819,130
[45] Date of Patent: Oct. 6, 1998

[54] IMAGE-FORMING SOLUTION SUPPLY METHOD AND HEATING CONTROL METHOD

[75] Inventor: Hiroshi Inoue, Kanagawa, Japan

[73] Assignee: Fuji Photo Film Co., Ltd., Kanagawa, Japan

[21] Appl. No.: 672,264

[22] Filed: Jun. 26, 1996

[30] Foreign Application Priority Data

Jun. 30, 1995 [JP] Japan .................................... 7-166650
Jun. 30, 1995 [JP] Japan .................................... 7-166651

[51] Int. Cl.$^6$ .................................................. G03D 13/00
[52] U.S. Cl. .......................... 396/571; 396/575; 396/626; 355/27
[58] Field of Search ................................. 355/30, 27–29, 355/77, 100; 396/626, 575, 576, 571, 630

[56] References Cited

U.S. PATENT DOCUMENTS

| 5,307,109 | 4/1994 | Miyasaka et al. | 396/626 |
| 5,493,363 | 2/1996 | Morita | 355/99 |
| 5,572,285 | 11/1996 | Takagi | 355/27 |

FOREIGN PATENT DOCUMENTS 6-110180 4/1994 Japan .

Primary Examiner—D. Rutledge
Attorney, Agent, or Firm—Sughrue, Mion, Zinn, Macpeak & Seas, PLLC

[57] ABSTRACT

The present invention relates to a method for supplying an image-forming solution, and a method for heating control. The method for supplying the image-forming solution comprises heating an applying section, supplying the image-forming solution from a supply container to the applying section by operating a supply pump during start-up of an image recording apparatus, stopping the supply pump, opening a drainage valve, and discharging the image-forming solution to the supply container so that no image-forming solution remains in the applying section, waiting for an image recording operation, closing the drainage valve and operating the supply pump when the image recording operation is performed so that the applying section is charged with the image-forming solution each time an image recording operation is performed, opening the drainage valve after passage of the image-recording material through the applying section so that the image-forming solution in the applying section is discharged to the supply container, and returning the imarge recording apparatus to a state in which no image-forming solution remains in the applying section. The method for heating control for the image-forming solution comprises judging an operating state of the supply pump, and detecting the temperature in the vicinity of a liquid channel-formed area formed in a guide member, and controlling an output of a heater on the basis of a judged state and a detected temperature.

20 Claims, 10 Drawing Sheets

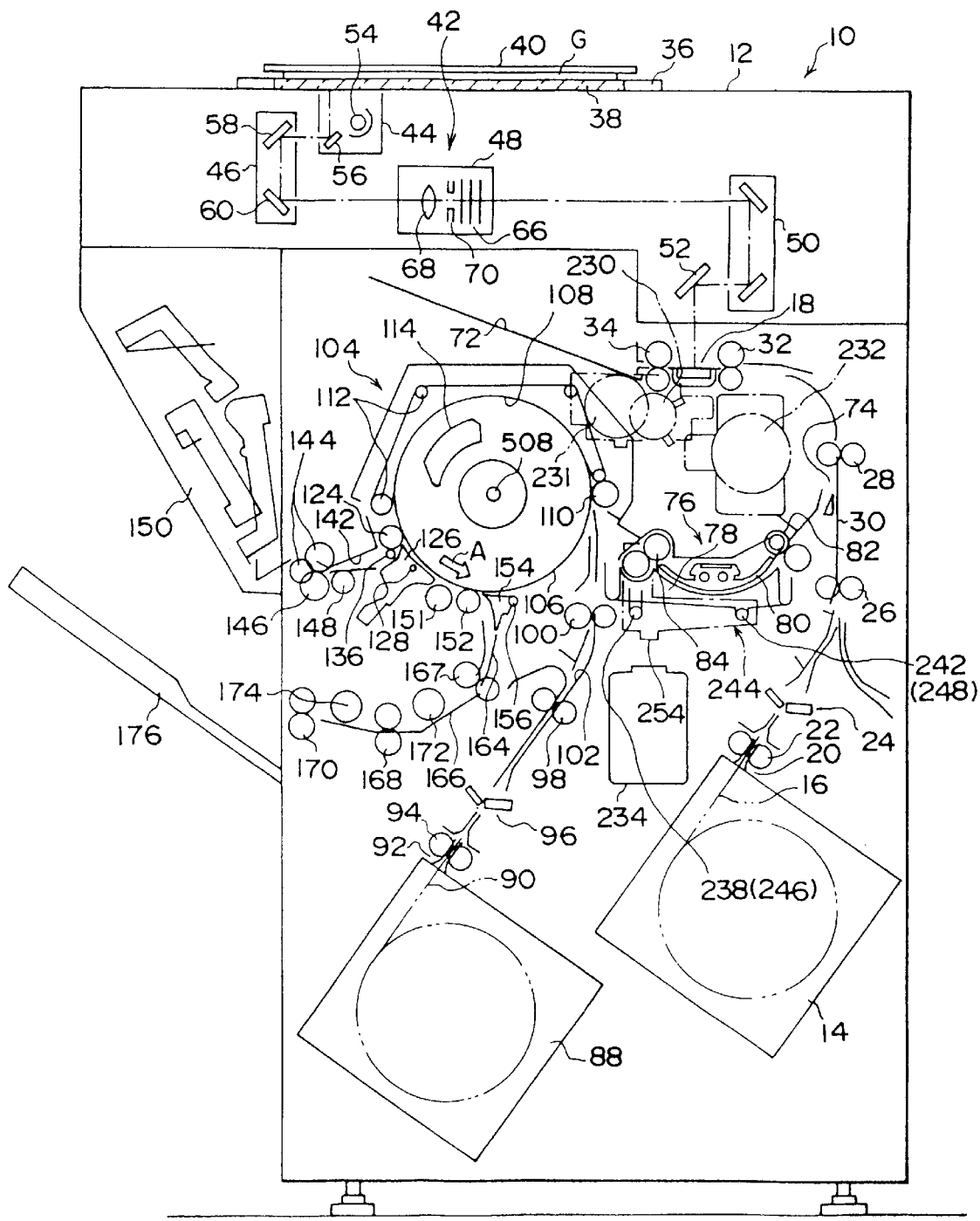
F I G. 1

F I G. 4
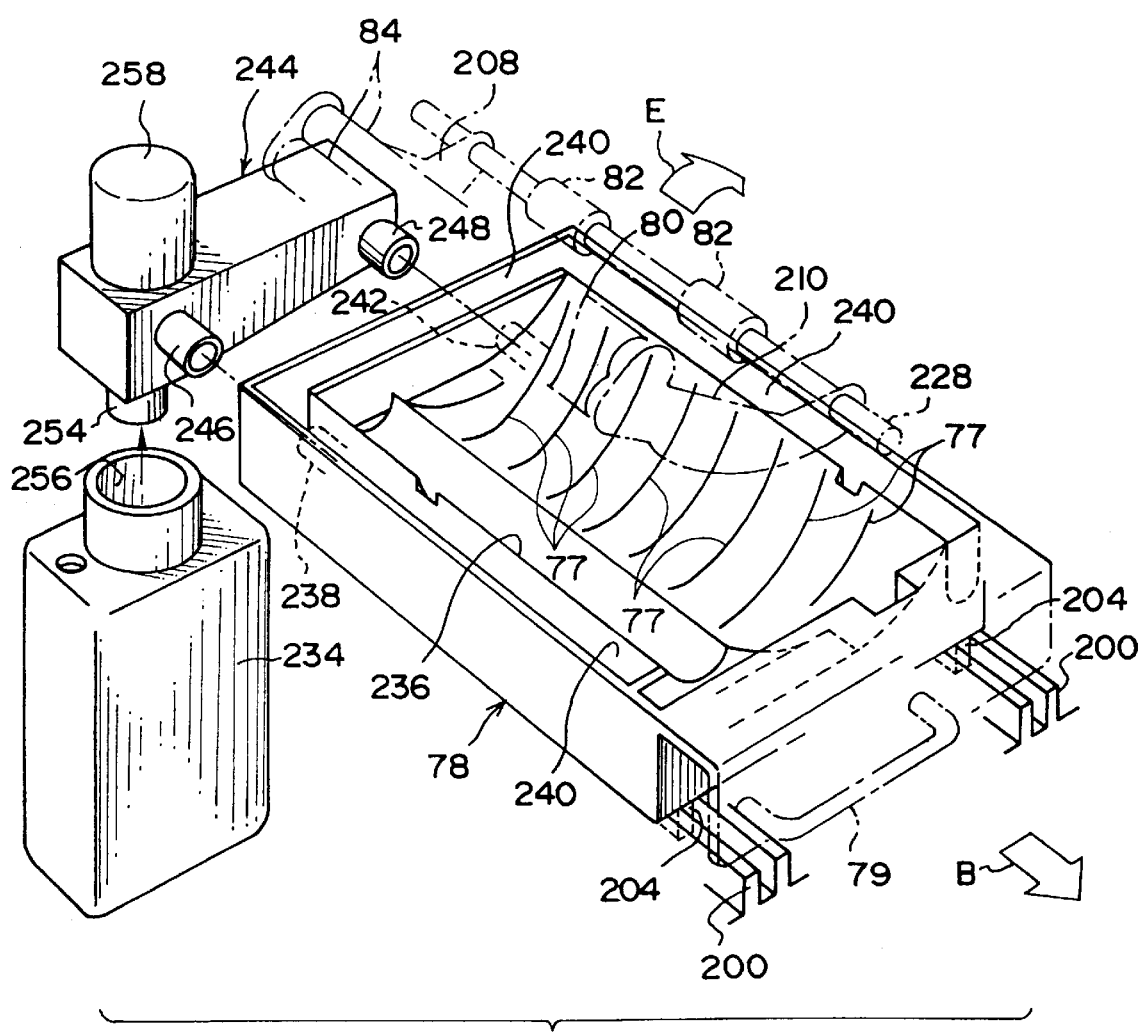

FIG. 8

| STATE | | ORDER OF MAGNITUDE OF THERMAL LOAD | TEMPERATURE OF APPLYING SECTION | |
|---|---|---|---|---|
| | | | POWER OF HEATER | |
| START-UP (UPON START OF TURNING ON OF HEATERS OF APPLYING SECTION) | | 3 | <32°C<br>100% | 32°C~38°C<br>16% | >38°C<br>0% |
| TURNING ON OF WATER SUPPLY PUMP | | 1 | <38°C<br>100% | 38°C~44.9°C<br>45% | >44.9°C<br>0% |
| TURNING OFF OF WATER SUPPLY PUMP | WATER IS PRESENT IN APPLYING TRAY | 2 | <30.3°C<br>100% | 30.3°C~40.4°C<br>12.5% | >40.4°C<br>0% |
| | WATER IS ABSENT IN APPLYING TRAY | 4 | <30.3°C<br>100% | 30.3°C~41.9°C<br>10% | >41.9°C<br>0% |

IMAGE-FORMING SOLUTION SUPPLY METHOD AND HEATING CONTROL METHOD

BACKGROUND OF THE INVENTION

1. Field of the Invention

The present invention relates to a method for supplying an image-forming solution and a heating control method in which the image-forming solution is supplied to an applying section by using an image recording apparatus provided with the applying section for allowing an image-recording material to pass therethrough so that the image-forming solution is applied to the image-forming material.

2. Description of the Related Art

An image recording apparatus as described below is known (Japanese Patent Application Laid-Open (JP-A) No. 6-110180). Namely, a photosensitive material (image-recording material) is exposed with an image. After the exposure, water (transfer auxiliary) as an image-forming solution is applied to the photosensitive material in order to improve the efficiency of heat-development transfer. The photosensitive material, to which water has been applied, is overlaid on an image-receiving material (image-recording material), and they are wound around an outer circumference of a heating drum to perform heat-development transfer.

An applying section is provided with an applying tray and a guide plate opposing thereto. The applying tray is charged with water. The image-forming solution is applied to the photosensitive material by allowing the photosensitive material to pass through a space between the applying tray and the guide plate.

Now supply of water will be explained below.

Water is supplied to the applying tray from a bottle. Water in the bottle is sucked by a pump, and it is cleaned through a filter. Cleaned water passes through a water channel formed in a thick portion of the guide plate, and it is fed into the applying tray.

A heater for the applying section is attached to the guide plate so that the guide plate is heated. Thus water is heated during passage through the water channel, and it is also heated in the applying tray after going out of the water channel. The guide plate is provided with a sensor for detecting the temperature (temperature of the applying section) of an area in the vicinity of the water channel. The heater for the applying section is controlled on the basis of a detected temperature.

A method of controlling the heating of an image-forming solution such as, for example, the method illustrated in FIG. 10 may be applied to the above-described image recording apparatus. The method illustrated in the flowchart of FIG. 10 will be described hereinafter.

When a power source for the image recording apparatus is turned on, then the heater of the applying section is operated (step 300), and the guide plate is heated.

When the guide plate is heated, and the temperature of the applying section arrives at 40° C. (step 302), then a discharge electromagnetic valve is closed (step 304). In this state, a water supply pump is operated for 120 seconds (step 306). Thus the applying tray is charged with a predetermined amount of the image-forming solution. If the temperature of the area in the vicinity of the water channel in the guide plate is 40° C. ±2° C. (step 308), then a ready state is obtained in which the routine waits for a printing operation (image recording operation) in a state in which the applying tray is charged with the predetermined amount of the image-forming solution.

After that, if there is the print operation (step 310),then the photosensitive material having been subjected to exposure passes through the applying section (step 314) provided that the applying section has a temperature of 40° C. ±2° C. (step 312), and water is applied to the photosensitive material.

After the photosensitive material has passed, the water supply pump is operated for 5 seconds (step 316), and water in the applying tray is replenished and maintained in a predetermined amount.

After that, the routine waits for the next printing operation.

If another printing operation is performed within 20 minutes, the steps 310, 312, 314, 316 are executed.

If no printing operation is performed within 20 minutes (step 318), then the discharge electromagnetic valve is opened (step 320), and the applying tray becomes empty. if reset operation is performed (step 322), then the steps 302, 304, 306, 308 are executed, and the routine returns to a state for waiting for the printing operation. The procedure described above is adopted so that water is exchanged in order to avoid the water becoming dirty which would be caused if water stays for a long period of time with no passage of the photosensitive material.

In order to maintain the image-forming solution to be fresh and clean, it is necessary to frequently exchange water in the applying section. However, such maintenance requires supply of a predetermined amount of water at a predetermined temperature every time when water is exchanged (resulting in increase in frequency of execution of the reset operation). However, if the reset operation is performed, it takes a long time until the routine returns to the standby for the printing operation. It is not preferable to increase the frequency of execution of the reset operation.

It is acknowledged that when the applying section has a temperature of 40° C. ±2° C. (target value), the temperature of water is a temperature which is proper for application. The output of the heater is increased if the temperature of the applying section detected by a temperature sensor is considerably lower than the target value. The output of the heater is decreased if the temperature is slightly lower than the target value. The output of the heater is made zero if the temperature fairly exceeds the target value. The control is performed in this manner so that the target value can be obtained efficiently in a short period of time by changing the output of the heater on the basis of the temperature of the applying section.

It is expected to realize a method for controlling the heater so that the target value is obtained efficiently in a shorter period of time. It is not enough to merely obtain the target value in a short period of time, but the stability is also required. Namely, it is necessary to avoid occurrence of over-shoot and hanging.

SUMMARY OF THE INVENTION

An object of the present invention is to provide a method for supplying an image-forming solution in which the image-forming solution to be charged to an applying section is exchanged every time when an image-recording operation is performed to make it possible to always apply the image-forming solution in a clean and fresh state to an image-recording material, and simultaneously a predetermined amount of the image-forming solution at a predetermined temperature is supplied in a short period of time so that the image recording process is not retarded.

Another object of the present invention is to provide a method for heating control for an image-forming solution in which a temperature, that is proper for application of the image-forming solution, can be efficiently obtained in a short period of time, and the stability can be also realized.

A first aspect of the present invention is a method for supplying an image-forming solution in which the image-forming solution is supplied to an applying section by using an image recording apparatus provided with the applying section for allowing an image-recording material to pass therethrough and applying the image-forming solution to the image-recording material, the method comprising the steps of:

heating the applying section;

supplying the image-forming solution from a supply container to the applying section by operating a supply pump during start-up of the image recording apparatus;

stopping the supply pump, opening a drainage valve, and discharging the image-forming solution to the supply container so that no image-forming solution remains in the applying section;

waiting for an image recording operation;

closing the drainage valve and operating the supply pump when the image recording operation is performed so that the applying section is charged with the image-forming solution each time an image recording operation is performed;

opening the drainage valve after passage of the image-recording material through the applying section so that the image-forming solution in the applying section is discharged to the supply container; and returning the image recording apparatus to a state in which no image-forming solution remains in the applying section.

A second aspect of the present invention is a method for supplying the image-forming solution according to the first aspect of the present invention, further comprising the step of detecting, during the image recording operation, whether a predetermined amount of the image-forming solution is charged in the applying section after passage of a predetermined period of time after closure of the drainage valve.

A third aspect of the present invention is a method for supplying the image-forming solution according to the first aspect of the present invention, further comprising the steps of:

providing a stepping motor as a motor for driving the supply pump;

providing a filter for filtrating the image-forming solution to be supplied to the applying section;

driving the motor at a low velocity by lowering an exciting frequency of the motor until the image-forming solution arrives at the supply pump from the supply container, if the supply pump is operated during the start-up of the recording apparatus or after exchange of the filter or after exchange of the supply container; and driving the motor at a high velocity by raising the exciting frequency.

A fourth aspect of the present invention is a method for supplying the image-forming solution according to the first aspect of the present invention, further comprising the steps of:

judging whether a temperature of the applying section is a predetermined temperature during the image recording operation; and causing the image-recording material to wait before the applying section if the temperature of the applying section is not the predetermined temperature:

allowing the image-recording material to pass through the applying section if the temperature of the applying section is the predetermined temperature.

A fifth aspect of the present invention is a method for heating control for an image-forming solution by using an image recording apparatus, the apparatus comprising an image-forming solution-applying section provided with an applying tray to be charged with the image-forming solution for being an image-recording material to pass therethrough so that the image-forming solution is applied to the image-forming material, a guide member provided opposing to the applying tray for guiding and passing through the image-recording material to a space between the guide member and the applying tray, a liquid channel formed in the guide member, a supply pump for supplying the image-forming solution from a supply container to the applying tray through the liquid channel in the guide member, a heater provided on the guide member, a temperature sensor for detecting a temperature in the vicinity of a liquid channel-formed area in the guide member, and a drainage means for draining the image-forming solution from the applying tray to the supply container, and the method comprising the steps of:

judging an operating state of the supply pump, and detecting the temperature in the vicinity of the liquid channel-formed area formed in the guide member; and controlling an output of the heater on the basis of a judged state and a detected temperature.

A sixth aspect of the present invention is a method for heating control for the image-forming solution according to the fifth aspect of the present invention, wherein the control is performed such that the output of the heater is controlled on the basis of the presence or absence of the image-forming solution in the applying tray when the supply pump is not operated.

According to the first to fourth aspect of the present invention, the image-recording material passes through the applying section of the image recording apparatus, and the image-forming solution is applied to the image-recording material. The image recording process is executed, for example, by exposing a photosensitive material, applying the image-forming solution to the photosensitive material after the exposure, overlaying the photosensitive material on an image-receiving material after the application to perform heat-development transfer, and recording an image on the image-receiving material.

Upon the start-up of the image recording apparatus, the supply pump is operated, and the image-forming solution is supplied from the supply container to the applying section. Since the applying section has been heated, the supplied image-forming solution is heated, and its temperature is raised.

After that, the supply pump is stopped, and the drainage valve is opened to provide the state in which no image-forming solution remains in the applying section. Thus the state for waiting for the image recording operation is obtained. The image-forming solutions waits in the supply container in a state in which its temperature is raised.

In the following steps, if the image recording operation is started, then the supply pump is operated in the state in which the drainage valve is closed, and the previously heated image-forming solution is supplied to the applying section each time an the image recording operation is performed. As mentioned in the fourth aspect, for example, if the applying section does riot have the predetermined temperature, then the image-forming material waits before the applying section, while if the temperature of the applying section is the predetermined temperature, then the image-forming material passes through the applying section. The drainage valve is opened after the passage of the image-recording material through the applying section. The image-forming solution in the applying section is drained to the supply container, and the apparatus returns to the state in which no image-forming solution remains in the applying section.

Accordingly, the image-forming solution to be charged to the applying section can be exchanged every time when the image forming operation is performed. Thus the image-forming solution in a fresh and clean state can be always applied to the image-recording material. Simultaneously, the previously heated image-forming solution is charged in the applying section. Therefore, it is easy to obtain the predetermined temperature by heating the image-forming solution in the applying section, if necessary. Thus the image-forming solution is supplied in a short period of time at a predetermined temperature in a predetermined amount, and the image recording process is not stagnated.

No image-forming solution exists in the flow channel between the supply pump and the supply container upon the start-up of the image recording apparatus, after exchange of the filter, and after exchange of the supply container. If the supply pump is operated in this state, a large load is applied until the image-forming solution arrives at the pump. Once the image-forming solution arrives at the supply pump, a small load is applied thereafter.

Accordingly, as mentioned in the third aspect in which the motor for driving the pump is constructed by the stepping motor, it is advantageous to use the method comprising driving the motor at a low velocity by lowering the exciting frequency of the motor until the image-forming solution arrives at the supply pump from the supply container, and then driving the motor at a high velocity by raising the exciting frequency. By doing so, it is unnecessary to use a large motor. Thus it is possible to supply a predetermined amount of supply in a short period of time even by using a small motor.

This aspect is effective in that a small motor is sufficient to drive the supply pump in order to supply the image-forming solution in a predetermined amount at a predetermined temperature in a short period of time so that the image recording process is not retarded. The cost is also reduced.

According to the second aspect, when the supply pump should be operated, if it is detected that the applying section is not charged with a predetermined amount of the image-forming solution even after passage of a predetermined period of time after closure of the drainage valve, then for example, alarm display is given to clarify the presence of abnormality of the liquid supply system or the liquid drainage system between the supply container and the applying section, for example, abnormality such as improper piping connection and filter setting and occurrence of disorder of the drainage valve and the supply pump. Therefore, it is possible to quickly deal with the abnormality.

As for the timing for the detection, it is available to use a timing before supply of the image-forming solution during the start-up of the image recording apparatus, or a timing before passage of the image-forming material through the applying section during the image recording operation. The timings mentioned above are adequate.

As explained above, according to the method for supplying the image-forming solution of the present invention, the image-forming solution to be charged to the applying section can be exchanged every time when the image forming operation is performed. Thus the image-forming solution in a fresh and clean state can be always applied to the image-recording material. Simultaneously, the image-forming solution can be supplied in a short period of time at a predetermined temperature in a predetermined amount so that the image recording process is not stagnated.

According to the method for heating control for the image-forming solution as mentioned in the fifth and sixth aspects, the image-recording material passes through the space between the applying tray and the guide member in the applying section for the image-forming solution, and the image-forming solution in the applying tray is applied to the image-recording material during the passage. The image recording process can be executed by, for example, exposing a photosensitive material, applying the image-forming solution to the photosensitive material after the exposure, overlaying the photosensitive material on an image-receiving material after the application to perform heat-development transfer, and recording an image on the image-receiving material.

The image-forming solution is supplied from the supply container to the applying tray. The image-forming solution is fed by the supply pump. It passes through the liquid channel in the guide member, and it is charged to the applying tray. The supply pump is operated when the empty applying tray is filled with the image-forming solution, when it is necessary to supplement a consumed amount of the image-forming solution in the applying tray, or when the image-forming solution is supplied to the applying tray in a circulating manner.

The guide member is heated by the heater. The image-forming solution is warmed during a period of passage through the liquid channel in the guide member, and in a state in which the image-forming solution goes out of the liquid channel and stays in the applying tray.

As for the heating control for the image-forming solution, the temperature in the vicinity of the liquid channel-formed area in the guide member serves as a factor to control the output of the heater. Additionally, whether the supply pump is in an operating state in which the supply pump is operated or in a non-operating state in which the supply pump is not operated also serves as a factor to control the output of the heater.

In the operating state of the supply pump, the thermal load is large because the image-forming solution passes through the liquid channel in the guide member. On the contrary, in the non-operating state of the supply pump, the thermal load is decreased by an amount corresponding to the effect that the image-forming solution does not pass through the liquid channel in the guide member. It is a matter of course that the output of the supply pump is made different depending on a difference in temperature of the applying section between a detected value and a target value (for example, depending on whether or not the detected value is considerably lower than the target value, whether or not the detected value is close to the target value, or whether or not the detected value exceeds the target value). Additionally, the heater is controlled such that the output of the heater is increased in the operating state of the supply pump, while the output of the heater is decreased in the non-operating state of the supply pump, even in the case of an identical temperature in the vicinity of the liquid channel-formed area in the guide member.

Accordingly, a temperature, which is proper for application of the image-forming solution, can be obtained efficiently in a short period of time, and the stability can be realized as well.

On the other hand, in the non-operating state of the supply pump, whether or not the image-forming solution is present in the applying tray serves as a factor to control the output of the heater. Namely, the thermal load is large when the image-forming solution is present in the applying tray, while the thermal load is small when the image-forming solution is absent in the applying tray. Considering this fact, the method as defined in the sixth aspects of the present invention provides more remarkable function and effect. Namely, according to the method as defined in the sixth aspects of the present invention, the heater is controlled such that the output of the heater is increased when the image-forming solution is present in the applying tray, while the output of the heater is decreased when the image-forming solution is absent in the applying tray, even in the case of an identical temperature in the vicinity of the liquid channel-formed area in the guide member.

As explained above, according to the method for heating control for the image-forming solution of the present invention, a temperature, which is proper for application of the image-forming solution, can be obtained efficiently in a short period of time, and the stability can be realized as well.

BRIEF DESCRIPTION OF THE DRAWINGS

FIG. 1 shows a schematic structual view illustrating an image recording apparatus to which the method for supplying an image-forming solution and the method for heating control according to the present invention are applied.

FIG. 4 shows a perspective view illustrating operations for attaching and detaching a tray member, corresponding to FIG. 3.

FIG. 8 is a graph illustrating the relation between the control factor and the output of heaters in the method for heating control for the image-forming solution.

DETAILED DESCRIPTION OF THE PREFERRED EMBODIMENT

Figure 2:
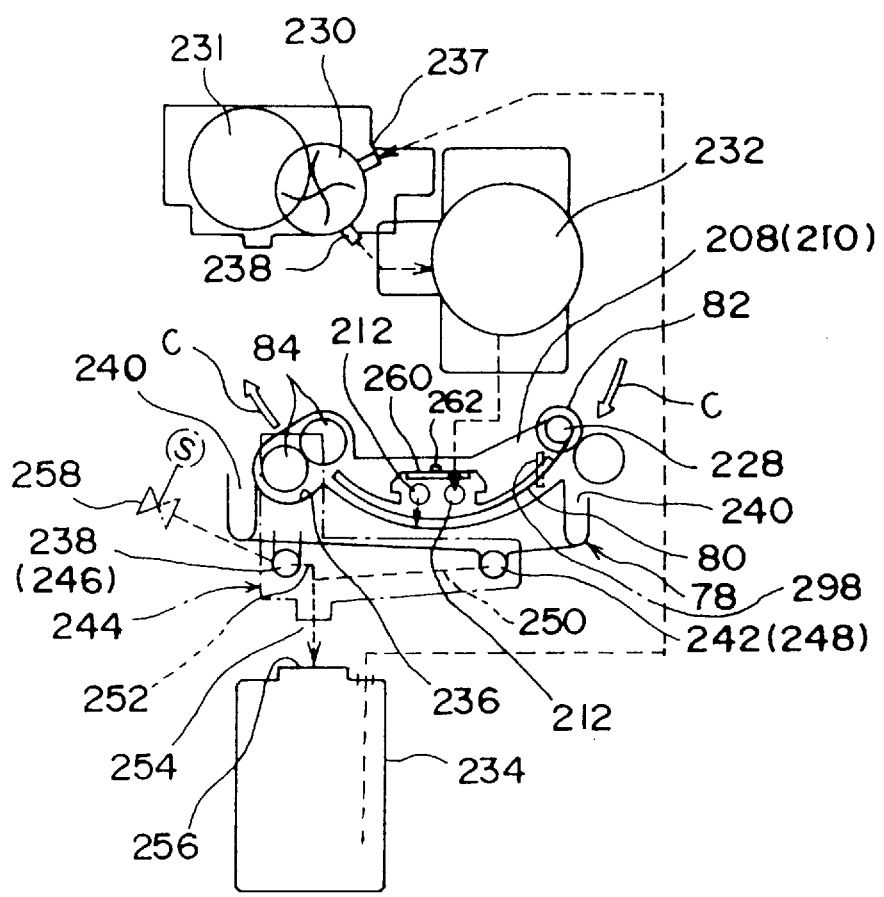
FIG. 2 shows a schematic arrangement view illustrating lines of a water supply system and a water discharge system for an applying section.

An embodiment of the method for supplying an image-forming solution according to the present invention will be explained below with reference to FIGS. 1 to 7, as applied to an image recording apparatus.

As shown in FIG. 1, the image recording apparatus 10 is provided with a machine stand 12, and it includes a photosensitive material magazine 14 in the machine stand 12. A photosensitive material 16 is wound in a rolled form and is accommodated within the photosensitive material magazine 14. The photosensitive material 16 comprises, on a support, photosensitive silver halide, a binder, a dye applying material, and a reducing agent. The photosensitive material 16 is wound in the photosensitive material magazine 14 so that its photosensitive (exposure) surface is directed upwardly when the photosensitive material 16 is disposed at an exposing section 18 described below.

The dimension of the photosensitive material 16 is, for example, 135 mm in its widthwise direction.

Although detailed illustration is not shown, the photosensitive material magazine 14 is constructed to be rectangular hollow prism-shaped, comprising a barrel having a length corresponding to the widthwise dimension of the photosensitive material 16, and a pair of end walls secured to both ends of the barrel. The photosensitive material magazine 14 is arranged obliquely as viewed in the widthwise direction of the photosensitive material so that circumferential surfaces of the barrel form planes which are inclined with respect to any of the vertical plane and the horizontal plane. A photosensitive material-drawing port 20 for drawing the photosensitive material 16 from the photosensitive material magazine 14 is formed at a corner which is located at the uppermost position among four corners as viewed in the widthwise direction of the photosensitive material.

Nip rollers 22, which serve as drawing rollers, are arranged in the outside vicinity of the photosensitive material-drawing port 20 of the photosensitive material magazine 14. In accordance with rotary driving of the nip rollers 22, the photosensitive material 16 passes through the photosensitive material-drawing port 20, and it is drawn obliquely upwardly in a predetermined length.

The photosensitive material 16 is drawn and transported by the nip rollers 22 at a velocity of, for example, 3.5 mm/sec.

A cutter 24 is arranged at a position located on a side of the nip rollers 22 in the direction of drawing the photosensitive material. The cutter 24 is capable of cutting the photosensitive material 16 drawn by the nip rollers 22 in a predetermined length. The cutter 24 may adopt a mechanism comprising, for example, a fixed blade and a rotary blade in which the photosensitive material 16 is cut by moving the rotary blade by using a wire or the like vertically with respect to the transport direction, and engaging the rotary blade with the fixed blade. After the cutting operation of the cutter 24, the nip rollers 22 are reversely rotated, and the photosensitive material 16 is reversely wound in a degree so that its forward end is slightly nipped by the nip rollers 22. The cutting operation of the cutter 24 and the operation of the nip rollers 22 for reversely winding the photosensitive material are conducted independently by a driving system which is different from that for the operation of the nip rollers 22 for drawing the photosensitive material.

Following the cutter 24, conveying rollers 26, 28 and a guide plate 30 are arranged. In accordance with rotary driving of the conveying rollers 26, 28, the photosensitive material 16 having been cut in the predetermined length is transported to the exposing section 18 located over the photosensitive material magazine 14.

The photosensitive material 16 is transported by the conveying rollers 26, 28 at a velocity of, for example, 50 mm/sec.

The exposing section 18 is located between conveying rollers 32, 34. The space between the conveying rollers 32, 34 is used as the exposing section (exposing point) 18, and the photosensitive material 16 passes horizontally through the space between the conveying rollers 32, 34.

The photosensitive material 16 is transported by the conveying rollers 32, 34 at a velocity of, for example, 50 mm/sec.

A holding plate 36 for placing an original G is provided on an upper surface of the machine stand 12. A rectangular hole is formed in the holding plate 36, and a transparent glass plate 38 is fitted to the hole. A pressing cover 40 is attached to the holding plate 36. The pressing cover 40 has a shaft for rotation provided along an edge on the back side of the machine stand 12 (the front side of the machine stand 12, that is the front side of the image recording apparatus 10, is indicated by an arrow B in FIG. 5) so that the pressing cover 40 can be opened and closed over the transparent glass plate 38. An exposing apparatus 42 is provided between the transparent glass plate 38 and the exposing section 18. The exposing apparatus 42 comprises a lamp unit 44, a mirror unit 46, a filter unit 48, a mirror unit 50, and a sixth reflecting mirror 52 which are provided in this order in a direction toward the exposing section 18. The lamp unit 44 comprises a rod-shaped halogen lamp 54 as a light source, and a first mirror 56. The mirror unit 46 comprises a second mirror 58 and a third mirror 60. The mirror unit 50 comprises a fourth mirror 62 and a fifth mirror 64. The filter unit 48 comprises three (C, M, Y) color correcting filters 66, a lens 68, and a diaphragm mechanism 70, and it is arranged between the third mirror 60 of the mirror unit 46 and the fourth mirror 62 of the mirror unit 50.

Exposure is performed as follows. Namely, when the lamp unit 44 and the mirror unit 60 moves along the document G, and the photosensitive material 16 passes through the exposing section 18 at a synchronized timing therewith, then the document G on the holding plate 36 is irradiated with light from the halogen lamp 54 in a form of slit. Reflected light from the document G passes through an optical path formed by the first mirror 56 of the lamp unit 44, the second and third mirrors 58, 60 of the mirror unit 46, the filter unit 48, the fourth and fifth mirror 62, 64 of the mirror unit 50, and the sixth mirror 52 in this order. The photosensitive surface of the photosensitive material, 16 is exposed with the light in a scanning manner.

If the magnification is changed from the equivalent magnification to perform exposure, the filter unit 48 and the mirror unit 50 move in accordance with a changed magnification.

The filter unit 48 performs image formation and color collection for the reflected light from the document G (the third mirror of the mirror unit).

A switch back section 72 is linked to the exposing section 18. The photosensitive material 16, which has passed through the exposing section 18 while undergoing scanning exposure, is once fed to the switch back section 72. After completion of the scanning exposure, the conveying rollers 32, 34 are reversely rotated, and thus the photosensitive material 16 passes through the exposing section 18 again. A changeover point 74 is provided below the conveying rollers 32, 34. A changeover operation at the changeover point 74 allows the photosensitive material 16 to be fed to an applying section 76 without returning to the side of the photosensitive material magazine 14.

The applying section is located between the exposing section 18 and the photosensitive material magazine 14, and it is provided with an applying tray 78. The applying tray 78 is charged with water as the image-forming solution. A guide plate 80 is attached over the applying tray 78. Supply rollers 82 are provided on an upstream side of the applying section 76 in the photosensitive material transport direction. A pair of squeeze rollers 84 are arranged on a downstream side in the photosensitive material transport direction. The photosensitive material 16 is fed into the applying tray 78 by the supply rollers 82, and it passes through a space between the guide plate 80 and the applying tray 78. Water is applied to the photosensitive material 16 during this passage. The photosensitive material 16, to which water has been applied, is interposed and transported by the squeeze rollers 84. Extra water of the applied water is removed and discharged to the outside of the applying tray 78. By using the image-forming solution, the heat-development transfer efficiency is improved upon heat-development transfer to be performed thereafter.

An image-receiving material magazine 88 is arranged adjacent to the photosensitive material magazine 14. An image-receiving material 90 is wound in a rolled form and accommodated in the image-receiving material magazine 88. The image-receiving material 90 has a widthwise dimension which is smaller than that of the photosensitive material 16 (for example, 127 mm). A dye-fixing material comprising a mordant is applied to an image-forming surface of the image-receiving material 90. The image-receiving material 90 is wound in the image-receiving material magazine 88 so that the image-forming surface serves as a plane opposing to the surface of the photosensitive material 16 upon overlay on the photosensitive material 16 as described below.

The image-receiving material magazine 88 is also rectangular hollow prism-shaped in the same manner as the photosensitive material magazine 14. It is inclined obliquely as viewed in the widthwise direction of the image-receiving material 90, and it includes an image-receiving material-drawing port 92 at a corner located at the uppermost position. The image-receiving material 90 passes through the image-receiving material-drawing port 92, and it is drawn in a predetermined length by nip rollers 94 followed by being cut by a cutter 96, which is the same as in the photosensitive material 16. However, the image-receiving material 90 is cut in a predetermined length which is shorter than the predetermined length of the photosensitive material 16 after cutting.

Following the cutter 96, conveying rollers 98, 100 and a guide plate 102 are arranged. In accordance with rotary driving of the conveying rollers 98, 100, the image-receiving material 90 having been cut in the predetermined length is transported to a heat-development transfer section 104 which is located over the image-receiving material magazine 88.

The heat-development transfer section 104 includes a heating drum 106 and an endless pressure-contact belt 108. It also includes a laminating roller 110.

The heating drum 106 includes a halogen lamp 508 in its inside. The endless pressure-contact belt 108 raises the temperature of an outer circumferential surface of the heating drum 106.

The heating drum 106 may be constructed by a pipe made of aluminum having a thin wall with its outer circumferential surface treated with fluorine coating and its inner circumferential surface painted with black heat-resistant painting, having a thickness of 3 mm, an outer diameter of 130 mm, and an effective width in the axial direction of 158 mm.

The endless pressure-contact belt 108 is provided over an area corresponding to an approximately half circumference of the heating drum 106 (approximately half area of the upper portion). The endless pressure-contact belt 108 is wound around four entraining rollers 112 arranged on the outer circumference of the heating drum 106 and spaced apart with each other at predetermined spacing distances so that it tightly contacts at the approximately half circumferential area in a state of contact with the outer circumferential surface of the heating drum 106. In accordance with rotary driving of the entraining rollers 112, the endless pressure-contact belt 108 moves. Accordingly, the rotation is transmitted to the heating drum 106 which is tightly contacted with the endless pressure-contact belt 108.

The heating drum 106 may have a peripheral velocity of, for example, 35 mm/sec. An applicable endless tight contact belt 108 may be formed by, for example, coating a woven cloth material with rubber, and allowing it to have a widthwise dimension of 224 mm. An applicable entraining roller 112 may comprise a rubber roller.

Alternatively, the entraining roller 112 may be made of stainless steel.

The laminating roller 110 is located corresponding to the applying section 76. The laminating roller 110 is allowed to tightly contact with the outer circumference of the heating drum 106 so that it is rotated and driven.

The photosensitive material 16 discharged from the applying tray 78 is fed to a space between the laminating roller 110 and the heating drum 106. On the other hand, the image-receiving material 90 is fed to a space between the heating drum 106 and the photosensitive material 16. In accordance with the movement of the endless pressure-contact belt 108, the rotation of the heating drum 106 (in the direction of an arrow A) following the endless pressure-contact belt 108, and the rotation of the entraining roller 112, the both of the photosensitive material 16 located outside and the image-receiving material 90 located inside are successively overlaid on the outer circumference of the heating drum 106 and wound therearound. Namely, the photosensitive material 16 and the image-receiving material 90 are transported while being interposed between the heating drum 106 and the endless pressure-contact belt 108. The photosensitive material 16 and the image-receiving material 90 are closely contacted with each other, and the image-receiving material 90 is closely contacted with the outer circumference of the heating drum 106. Once a state is achieved in which all portions of the photosensitive material 16 and the image-receiving material 90 are wound around the heating drum 106, the photosensitive material 16 and the image-receiving material 90 are located over the extending area of the endless pressure-contact belt 108 (namely over the approximately half circumference of the heating drum). The heating drum 106 stops in this state. The photosensitive material 16 and the image-receiving material 90 are heated in the stopped state. Accordingly, the movable dyes in the photosensitive material 16 are released. The dyes are transferred to the dye-fixing layer on the image-receiving material 90. Thus an image is obtained on the image-receiving material 90. Namely, the heat-development transfer is performed.

When the photosensitive material 16 and the image-receiving material 90 arc fed to the space between the laminating roller 110 and the heating drum 106, the image-receiving material 90 is fed to the space between the heating drum 106 and the photosensitive material 16 at a timing in which the photosensitive material 16 precedes by a predetermined length. As described above, the image-receiving material 90 is smaller than the photosensitive material 16 in any of the widthwise dimension and the longitudinal dimension. Accordingly, when the photosensitive material 16 and the image-receiving material 90 are overlaid with each other, a state is given in which peripheral portions including all four edges of the photosensitive material 16 project from peripheral portions of the image-receiving material 90. The projecting peripheral portions of the photosensitive material 16 closely contact with the outer circumference of the heating drum 106.

The photosensitive material 16 and the image-receiving material 90 are transported by the squeeze rollers 84 and the conveying rollers 100 at a velocity which is set to be slightly slower (for example, by about 2%) than a velocity at which the photosensitive material 16 and the image-receiving material 90 are transported by the laminating roller 110. Accordingly, a back tension acts on the photosensitive material 16 and the image-receiving material 90 when they are fed to the laminating roller 110.

A guide roller 124 is provided at a position in the vicinity of the endless pressure-contact belt 108 on a side in the rotational direction of the heating drum (namely, in the vicinity of a downstream end in the transport direction of the photosensitive material 16 and the image-receiving material 90). The guide roller 124 is rotated and driven while being tightly contacted with the outer circumference of the heating drum 106. In accordance with rotation of the heating drum 106 after the heat-development transfer, the photosensitive material 16 and the image-receiving material 90 are interposed between the heating drum 106 and the guide roller 124 and transported by them.

A rubber roller made of silicon rubber may be used as the guide roller 124.

A photosensitive material-peeling pawl 126 is provided on a side of the guide roller 124 in the rotational direction of the heating drum (namely, on a downstream side in transport direction for the photosensitive material 16). The photosensitive material-peeling pawl 126 is provided with a pawl shaft 128 disposed in parallel to the axial direction of the heating drum 106. The photosensitive material-peeling pawl 126 is rotated about an axis of the pawl shaft 128 so that it is (capable of make contact and separation with respect to the outer circumference of the heating drum 106.

The photosensitive material-peeling pawl 126 abuts against the outer circumference of the heating drum 106 before the preceding forward end of the photosensitive material 16, which moves in accordance with the rotation of the heating drum 106, arrives at a position corresponding to the photosensitive material-peeling pawl 126. Thus the photosensitive material-peeling pawl 126 engages with the preceding forward end of the photosensitive material 16, and the preceding portion is peeled off from the heating drum 106. The photosensitive material-peeling pawl 126 is separated from the outer circumference of the heating drum 106 before the image-receiving material 90 arrives at the photosensitive material-peeling pawl 126. Once the photosensitive material 16 is peeled off from the image-receiving material 90, the image-receiving material 90, which moves in accordance with the rotation of the heating drum 106, can pass through a space between the photosensitive material-peeling pawl 126 and the outer circumference of the heating drum 106.

When the photosensitive material-peeling pawl 126 is separated from the outer circumference of the heating drum 106, the photosensitive material 16 is interposed between the guide roller 124 and a pinch roller 136. The photosensitive material 16 is bent around the guide roller 124, and it is transported so that it is positively peeled off from the image-receiving material 90.

A guide plate 142, photosensitive material-discharging rollers 144, a backup roller 146, and a guide roller 148 are arranged along the transport direction for the photosensitive material following the guide roller 124 and the pinch roller 136. The photosensitive material-discharging rollers 144 are provided as a pair of so-called corrugation rollers meshed with each other. The backup roller 146 contacts with one of the photosensitive material-discharging rollers 144. In accordance with rotary driving of the photosensitive material-discharging rollers 144, the peeled photosensitive material 16 is accumulated in a waste photosensitive material-accommodating box 150.

The photosensitive material-discharging rollers 144 have a peripheral velocity of rotation which is set to be faster than a peripheral velocity of rotation of the heating drum 106 by 1 to 3%. Thus the photosensitive material 16 is prevented from being loosened and stuck to the guide plate 142.

A peeling roller 152 and an image-receiving material-peeling pawl 154 are arranged in this order on a side of the photosensitive material-peeling pawl 126 in the rotational direction of the heating drum. The peeling roller 152 is tightly contacted with the outer circumference of the heating drum 106, and thus it is rotated and driven. A comb-shaped roller 151 is provided between the photosensitive material-peeling pawl 126 and the peeling roller 152, the comb-shaped roller 151 opposing to the outer circumference of the heating drum 106.

The peeling roller 152 may be a rubber roller made of silicon rubber.

The image-receiving material-peeling pawl 154 is provided with a pawl shaft 156 disposed in parallel to the shaft of the heating drum 106. The image-receiving material-peeling pawl 154 is rotated about an axis of the pawl shaft 156, and it is capable of making contact and separation with respect to the outer circumference of the heating drum 106. The image-receiving material-peeling pawl 154 abuts against the outer circumference of the heating drum 106 before the image-receiving material 90, which moves in accordance with the rotation of the heating drum 106, arrives at a position corresponding to the image-receiving material-peeling pawl 154. Thus the image-receiving material-peeling pawl 154 engages with the forward end of the image-receiving material 90, and the image-receiving material 90 is peeled off from the heating drum 106. The image-receiving material 90 is bent around the peeling roller 152, and it is transported.

Guide plates 164, 166, image-receiving material-discharging rollers 167, 168, 170, and guide rollers 172, 174 are arranged following the peeling roller 152 and the peeling pawl 154. The image-receiving material 90, which has been peeled off from the outer circumference of the heating drum 106 by the peeling roller 152 and the image-receiving material-peeling pawl 154, is guided and transported by them. In accordance with rotary driving of the image-receiving material-discharging rollers 167, 168, 170, the image-receiving material 90, which has been peeled off from the outer circumference of the heating drum 106, is discharged to a tray 176.

The entraining rollers 112, the laminating roller 110, the photosensitive material-discharging rollers 144, the guide roller 124, the peeling roller 152, the squeeze rollers 84, and the image-receiving material-discharging rollers 167, 168, 170 can be rotated and driven by using a common drum motor (not shown).

The timing for the photosensitive material-peeling pawl 126 to make contact and separation with respect to the outer circumference of the heating drum 106, and the timing for the image-receiving material-peeling pawl 154 to make contact and separation with respect to the outer circumference of the heating drum 106 can be adjusted by using, for example, a cam mechanism which employs a cam section 114 provided at an end wall of the heating drum 106 so that it rotates integrally with the heating drum 106.

Now the applying section 76 will be explained in detail below.

Figure 3:
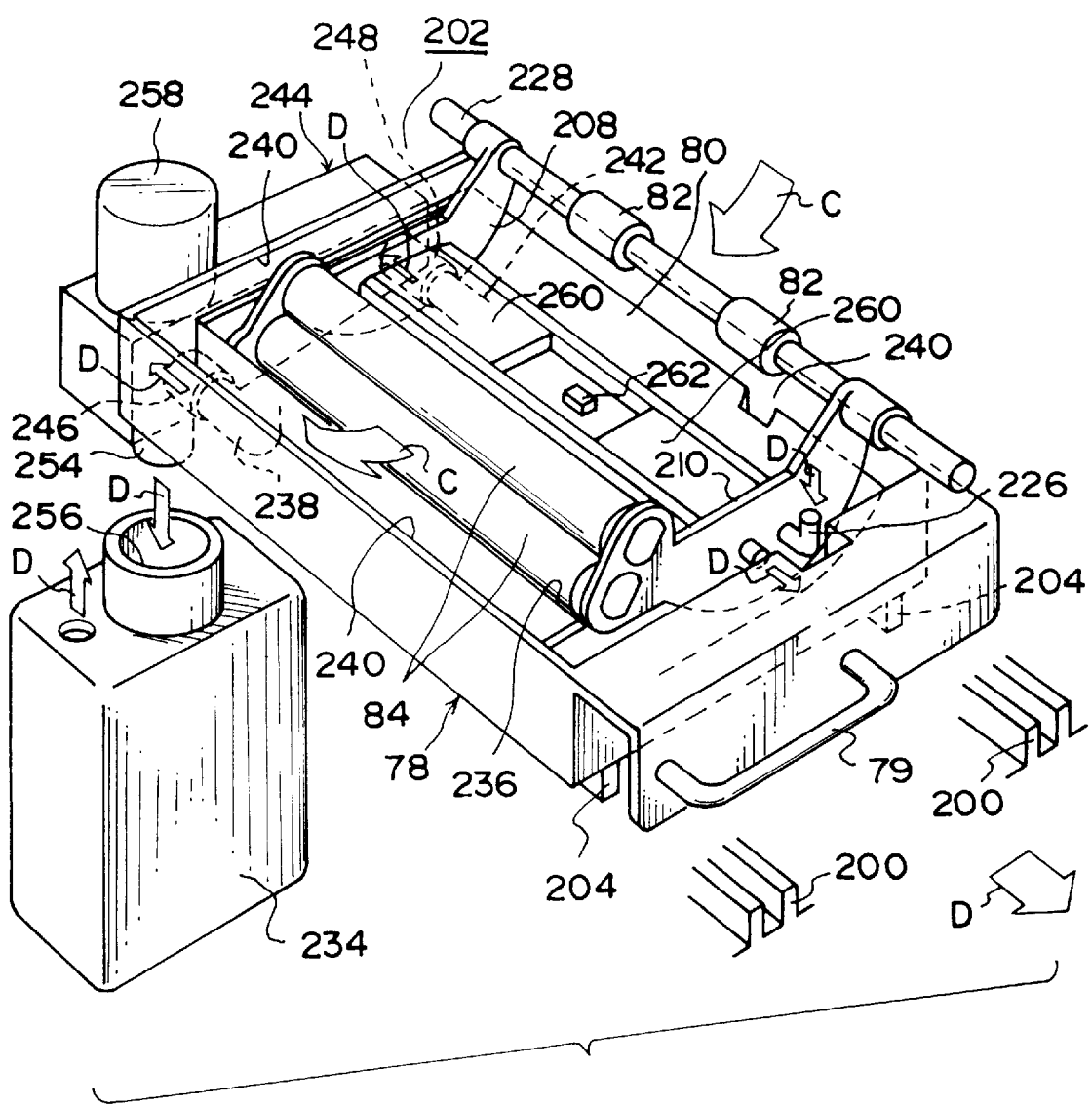
FIG. 3 shows a perspective view illustrating the applying section.
Figure 5:
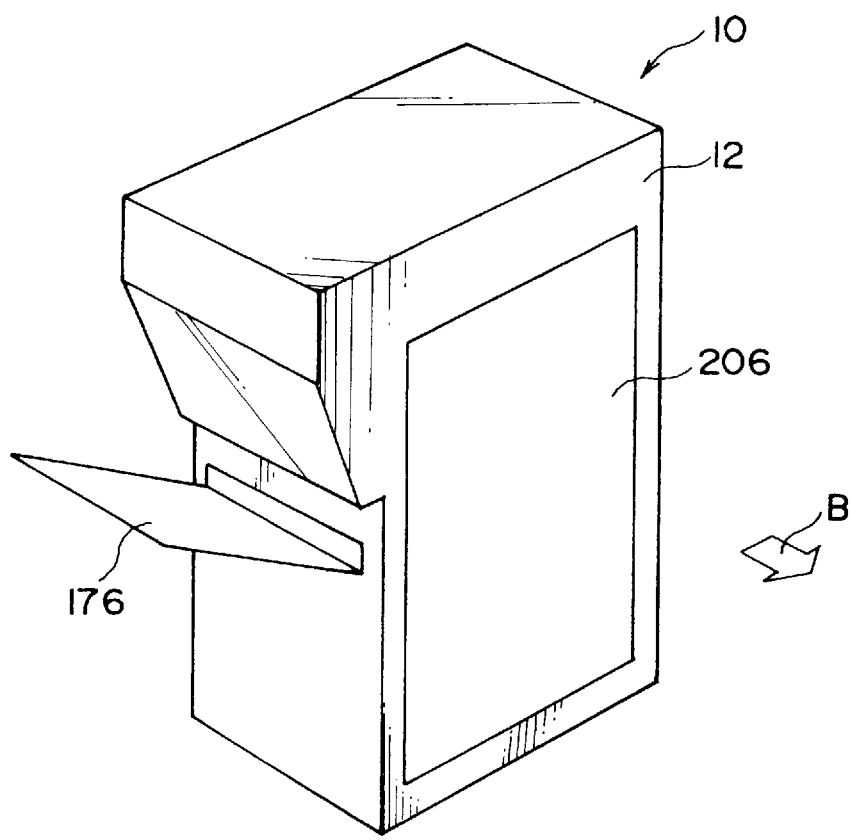
FIG. 5 shows a perspective view illustrating an appearance of the image recording apparatus.

As shown in FIG. 3, rails 200 are arranged under the applying tray 78. The rails 200 are provided to extend along the widthwise direction of the photosensitive material 16, which are formed to be ridge-shaped as viewed in the longitudinal direction. The rails 200 are provided as two pairs which are spaced apart to one another, each pair comprising two rails. Two guide ridges 204 are provided to project on a bottom lower surface of the applying tray 78 corresponding to each of the pairs of rails. Each of the guide ridges 204 is fitted to a recess formed between the corresponding pair of rails 200 to make guidance for sliding movement along the longitudinal direction of the rails 200. Accordingly, the applying tray 78 is attachable and detachable with respect to an accommodating section 202. The applying tray 78 can be detached and attached by opening a front door 206 (see FIG. 5) provided on the front side of the machine stand 12. A grip section 79 for attaching and detaching operation is provided on a detachment side.

A bottom upper surface of the applying tray 78 is formed to be circular arc-shaped so that it is recessed at an approximately central portion in the photosensitive material transport direction (namely, the direction indicated by an arrow C). As shown in FIG. 4, a plurality arrays of ribs 77 are formed on the bottom upper surface of the applying tray 78 formed to have the circular arc shape as described above. The ribs 77 are formed with their longitudinal direction which extends along the transport direction for the photosensitive material 16. Accordingly, the frictional resistance upon passage of the photosensitive material 16 is reduced, and the photosensitive material 16 is prevented from being scratched at its certain position.

The guide plate 80 is attached to a pair of support plates 208, 210 opposing to each other in the widthwise direction of the photosensitive material 16 so that the guide plate 80 is interposed between the support plates 208, 210. The guide plate 80 and the support plates 208, 210 constitute a guide member. Lower edges of the support plates 208, 210, and a bottom surface of the guide plate 80 are formed to be circular arc-shaped corresponding to the bottom upper surface of the applying tray 78.

As shown in FIG. 2, the guide plate 80 is formed to be thick at its central portion in the photosensitive material transport direction. Two parallel hollow channels 212 are formed in the thick portion to traverse the space between the support plates 208, 210. The two hollow channels 212 communicate with ports 214, 216 at one ends (ends located on the front side of the machine stand 12) respectively, and they communicate with each other at the other ends (ends located on the back side of the machine stand 12) respectively. Thus a U-shaped liquid channel is formed ranging from the one port 214 to the other port 216. The one port 214 is allowed to have an L-shaped configuration, which opens upwardly. The other port 216 opens in its original direction, which is capable of communicating with the inside of the applying tray 78.

A roller shaft 228 of the supply roller 82 described above penetrates through end portions of the support plates 208, 210 on an upstream side in the photosensitive material transport direction. Accordingly, the guide plate 80 approaches and goes away from the bottom upper surface of the applying tray 78. The squeeze rollers 84 traverse, and they are rotatably supported between end portions of the support plates 208, 210 on a downstream side in the photosensitive material transport direction.

In an approached state for the guide plate 80 and the applying tray 78, a gap is formed between the guide plate 80 and the applying tray 78, through which the photosensitive material 16 passes.

In a separated state for the guide plate 80 and the applying tray 78 provided by rotation from the approached state in a direction of an arrow E shown in FIG. 4, the entire guide member including the guide plate 80 is separated from the applying tray 78, making it possible to perform a detaching operation for the applying tray 78.

As shown in FIG. 2, a water supply pump (supply pump) 230 and a water filter (filter) 232 are provided over the applying section 76. A bottle (supply container) 234 is provided under the applying section 76. An inlet 231 of the water supply pump 230 is connected to the bottle 234, an outlet 238 of the water supply pump 230 is connected to the filter 232, and the filter 232 is connected to a socket 226 of the guide member. Water in the bottle 234 is sucked by the water supply pump 230. Sucked water is cleaned through the water filter 232. Cleaned water passes through the hollow channels 212 in the guide plate 80 in the U-shaped configuration, and it is supplied from the port 216 to the inside of the applying tray 78. In FIG. 2, both of the water supply system and the water discharge system are depicted by dotted lines. In FIG. 3, the direction of water flow is indicated by arrows D. The water supply pump 230 is driven by a stepping motor (motor) 231.

As shown in FIGS. 2 and 4, in the applying tray 78, one end of a second discharge conduit (second drainage conduit) 238 is formed and connected to a roller arrangement groove 236 into which the lower roller of the squeeze rollers 84 is inserted. One end of a first discharge conduit (first drainage conduit) 242 is formed and connected to an overflow recessed groove 240 arranged at the periphery of the applying tray 78.

The other ends of the first and second discharge conduits 238, 242 are arranged and spaced apart in the photosensitive material transport direction, which open toward the attachment side for the applying tray 78 (the back side of the machine stand 12, or the side opposite to the arrow B). A receiving port case (receiving port member) 244 is provided on the side of the accommodating section 202, corresponding to the first and second discharge conduits 238, 242. The receiving port case 244 is rectangular box-shaped, which is lengthy in the photosensitive material transport direction. The receiving port case 244 is provided with a first receiving port 248 corresponding to the first discharge conduit 242 and a second receiving port 246 corresponding to the second discharge conduit 238. The first and second receiving ports 246, 248 project and open toward the side in the detachment direction for the applying tray 78, opposing to the first and second discharge conduits 238, 242.

When the applying tray 78 is moved from the detachment position to the attachment position in the direction opposite to the arrow B, then the first and second discharge conduits 242, 238 are inserted into the first and second receiving ports 248, 246 respectively, and they are connected to one another. When the applying tray 78 is moved from the attachment position to the detachment position in the direction of the arrow B, then the first and second discharge conduits 242, 238 are pulled out from the first and second receiving ports 248, 246 respectively, and the connection is released.

As shown in FIG. 2, two discharge channels of a first discharge channel (first drainage channel) 250 and a second discharge channel (second drainage channel) 252 are formed in the receiving port case 244. One end of the first discharge channel 250 communicates with the first receiving port 248, and one end of the second discharge channel 252 communicates with the second receiving port 246. The both discharge channels 250, 252 merge into one at the other ends to form a merged port 254 there. The merged port 254 opens downwardly, which is closely located just over an bottle mouth 234 of the bottle 234. A discharge electromagnetic valve (drainage valve) 258 is provided at an intermediate position of the second discharge channel 252. For example, when the discharge electromagnetic valve 258 is turned on, the second discharge channel 252 is opened, while when the discharge electromagnetic valve 258 is turned off, the second discharge channel 252 is blocked.

Supplied water in the applying tray 78 will be describe. Extra water overflows into the overflow recessed groove 240 in order to maintain a constant amount of charged water in the applying tray 78. The overflow water passes through the first discharge conduit 242 and the first discharge channel 250, and it returns to the bottle 234. Water in the applying tray 78 can be forcibly discharged to empty the inside of the applying tray 78 by opening the electromagnetic valve 258. Forcibly discharged water passes through the second discharge conduit 238 and the second discharge channel 252, and it returns to the bottle 234.

As shown in FIGS. 2 and 3, heaters 260 such as ceramic heaters are attached on an upper surface of the thick portion of the guide plate 80. The heaters 260 are provided in a pair so that they are spaced apart in an opposed manner in the widthwise direction of the photosensitive material. A temperature-detecting sensor 262 is attached between the heaters 260. The heaters 260 are capable of heating the guide plate 80 so that water passing through the hollow channels 212 is heated, and that water in the applying tray 78 is heated. The temperature-detecting sensor 262 detects the temperature of an area in the vicinity of the hollow channels 212 in the guide plate 80 (temperature of the applying section). The heaters 260 are controlled on the basis of the temperature detected by the temperature-detecting sensor 262. Thus the temperature of water in the applying tray 78 can be (controlled (for example, at 40° C. ± 2° C.). This control can be performed by using, for example, SSR (solid state relay).

As shown in FIG. 2, a water-detecting sensor 298 is provided inside the applying tray 78. The water-detecting sensor 298 can detect whether or not the applying tray 78 is charged with a predetermined amount of water (an amount of water required for application).

Next, supply of water to the applying tray 78 and the guide plate 80 will be explained with reference to flow charts shown in FIGS. 6 and 7.

Figure 6:
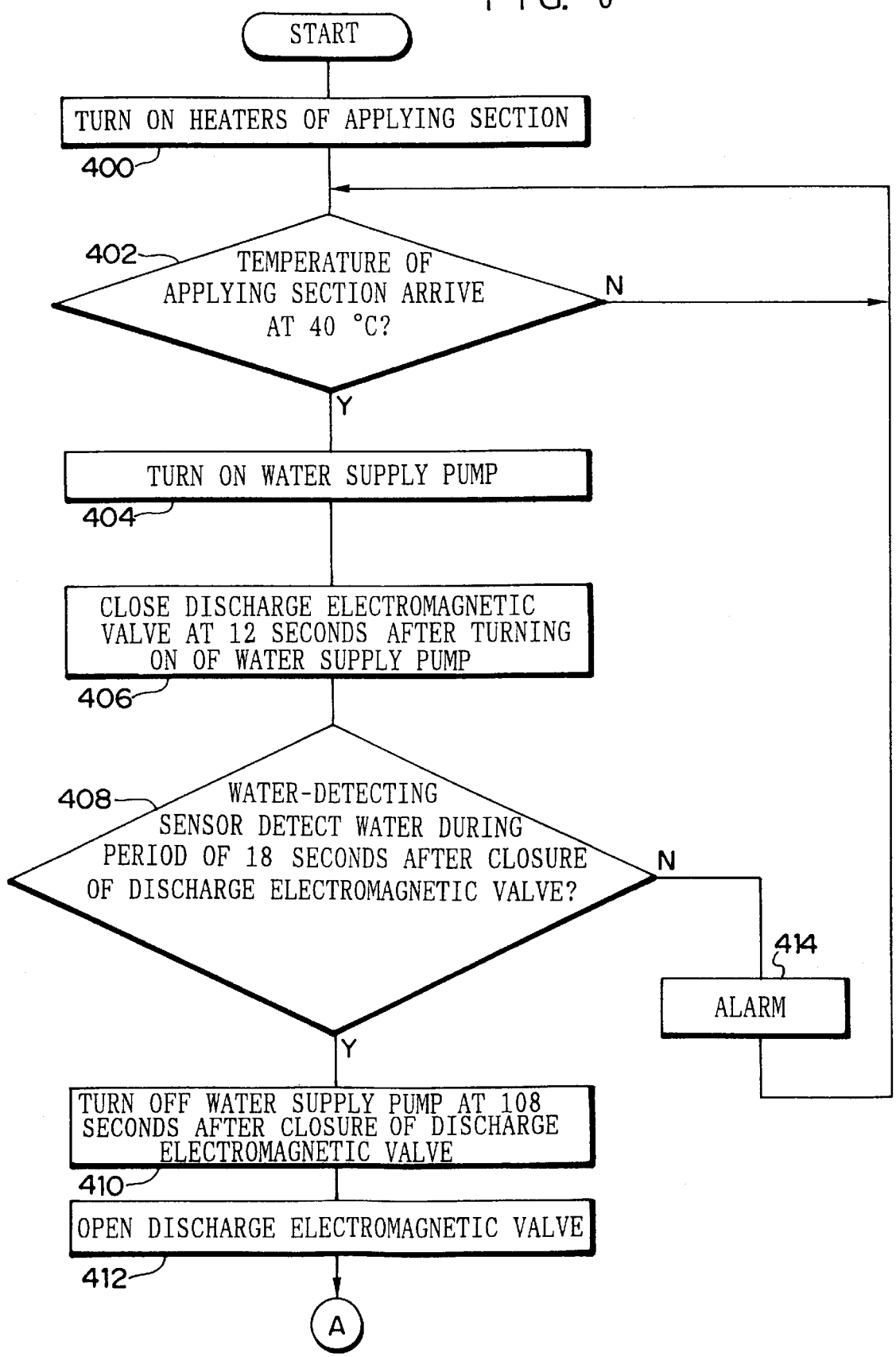
FIG. 6 shows a flow chart illustrating a method for supplying water and a method for heating control for the applying section.

As shown in FIG. 6, if the power source for the image recording apparatus 10 is turned on, then the heaters 260 of the applying section are operated (step 400) to heat the guide plate 80.

During start-up of the image recording apparatus 10, if the guide plate 80 is heated, and the temperature of the applying section arrives at 40° C. (step 402), then the water supply pump 230 is operated (turned on) (step 404). It is contemplated that the temperature of water is raised effectively by circulating supply as described below.

Next, the discharge electromagnetic valve 258 is closed after 12 seconds of operation of the water supply pump (step 406). This step is performed in order that no dirt stays in the applying tray 78 resulting from exchange of the filter 232 or the like. During an initial period of operation of the water supply pump 230, water is immediately returned to the bottle 234 so that no water stays in the applying tray 78.

Next, the presence or absence of water is judged on the basis of detection by the water-detecting sensor 298 during 18 seconds of operation of the water supply pump 230 after closure of the discharge electromagnetic valve 258 (step 408). The period of 18 seconds is a period of time sufficient to supply a predetermined amount of water to the applying tray 78 and the guide plate 80.

If the water-detecting sensor 298 detects the presence of water, then the water supply pump 230 is stopped at 108 seconds after closure of the discharge electromagnetic valve 258 (step 410). Overflow takes place on the applying tray 78 by the operation of the water supply pump 230 in a state in which the discharge electromagnetic valve 258 is closed. Thus water returns to the bottle 234, and water is subjected to circulating supply. In accordance with the circulating supply of water, the temperature of water is raised, and for example, water at 10° C. is warmed to 27° C. By maintaining the closed state of the discharge electromagnetic valve 258, a predetermined amount of water stays in the applying tray 78, which is preferred from a viewpoint of the temperature-raising effect.

Next, the discharge electromagnetic valve 258 is opened (step 412). Accordingly, water in the applying tray 78 is discharged to the bottle 234, and the applying tray 78 becomes empty. Namely, a state is obtained in which the routine waits for an printing operation. Water is stored in the bottle 234 in a temperature-raised state.

On the other hand, if the water-detecting sensor 298 detects the absence of water in the step 408, then an alarm is displayed (step 414). Accordingly, it is clarified that there is abnormality in the water supply system or the water discharge system between the bottle 234 and the applying tray 78, the guide plate 80, for example, abnormality such as improper piping connection and setting of the filter 232 and occurrence of disorder of the discharge electromagnetic valve 253 and the supply pump 230. Therefore, it is possible to quickly deal with the abnormality.

Figure 7:
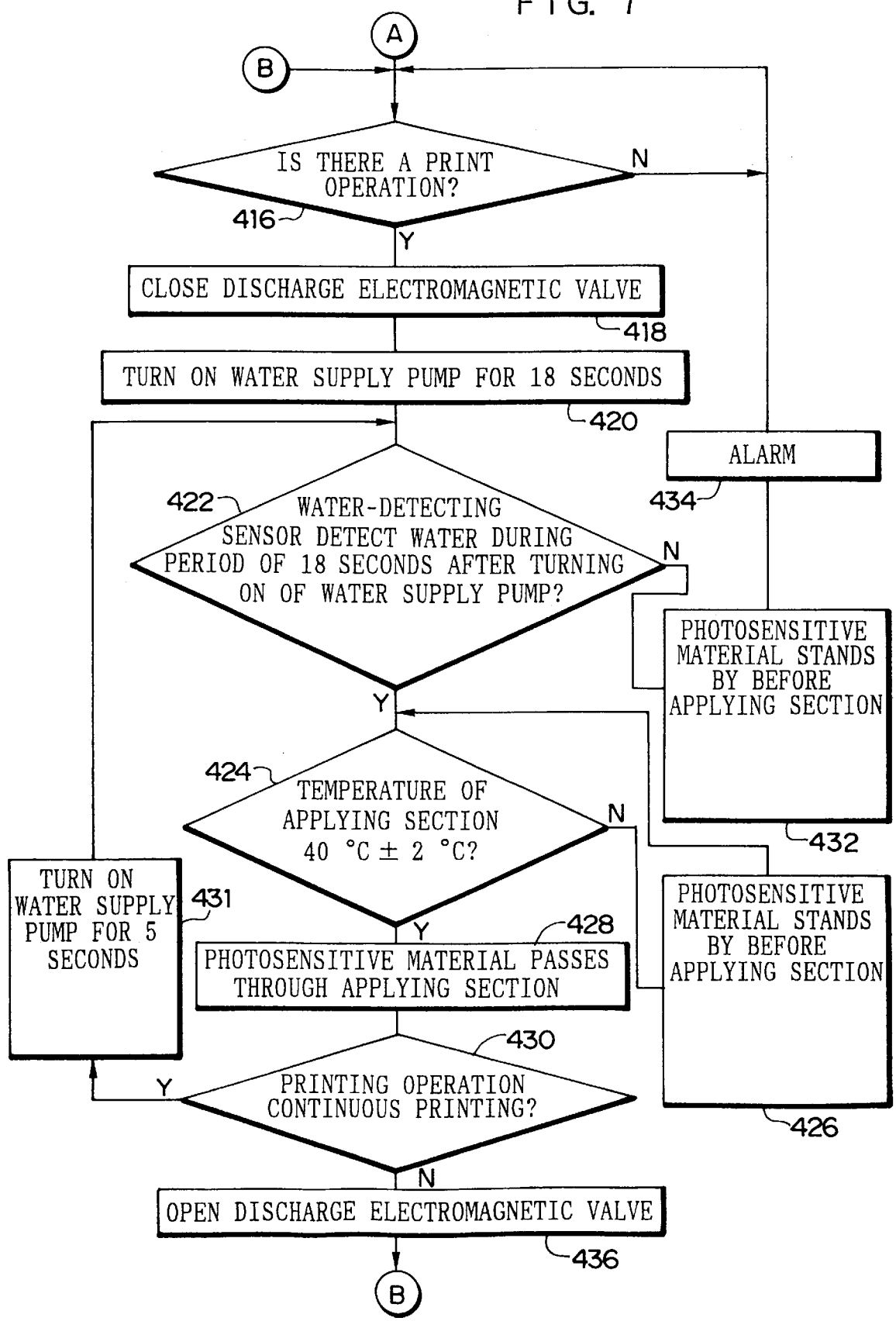
FIG. 7 shows a flow chart illustrating the method for supplying water and the method for heating control for the applying section.

After that, as shown in FIG. 7, the presence or absence of a printing operation is judged in a step 416. If the printing operation (image recording operation) is performed, then the discharge electromagnetic valve 258 is closed (step 418) every time when the printing operation is performed, and the supply pump 230 is operated in a state in which the discharge electromagnetic valve 258 is closed (step 420). The presence or absence of water is judged during 18 seconds of operation of the supply pump 230 on the basis of detection by the water-detecting sensor 298 (step 422).

If the water-detecting sensor 298 detects the presence of water, the following steps are executed. Namely, in a step 424, it is judged whether or not the temperature of the applying section is 40° C. ±2° C. on the basis of the detection by the temperature-detecting sensor 262. In accordance with the proceeding of the printing operation, the photosensitive material 16 is drawn out of the photosensitive material magazine 14. The photosensitive material 16 is transported, and exposed at the exposing section 18, and then it arrives at a position in front of the applying section 76. The photosensitive material 16 arrives at the position in front of the applying section 76 at about 20 seconds after the start of the printing operation. The water-detecting sensor 298 detects the presence of water when the period of 18 seconds has passed since the supply pump 230 was operated. Accordingly, if the arrival of the photosensitive material 16 at the position in front of the applying section 76 is earlier than the detection of the presence of water by the water-detecting sensor 298, then the routine waits as it is. Even when the water-detecting sensor 298 detects the presence of water, if the temperature of the applying section is not at the predetermined temperature, then the photosensitive material 16 waits at the position in front of the applying tray 78 and the guide plate 80 (step 426), or if the temperature of the applying section is at the predetermined temperature, then the photosensitive material 16 passes through the applying tray 78 and the guide plate 80 (step 428).

Next, it is judged whether or not the printing operation is continuous printing (step 430). If the printing operation is continuous printing, namely if a plurality sheets of the photosensitive material continuously pass through the applying tray 78 and the guide plate 80 during one printing operation, then the supply pump 230 is operated for 5 seconds after passage of one sheet of the photosensitive material 16 through the applying tray 78 and the guide plate 80 (step 431). Accordingly, water in the applying tray 78 is supplemented, and it is maintained in a predetermined amount. After that, the steps 422, 424, 428, 430 are executed corresponding to the next photosensitive material 16.

After passage of the last photosensitive material 16 through the applying section 76 in the continuous printing, if there is no continuous printing thereafter, then the discharge electromagnetic valve 258 is opened, and water in the applying tray 78 is drained to the bottle 234 to restore the apparatus to a state in which no water remains in the applying tray 78 (step 436).

After that, the routine waits for the next printing operation. It is possible to always apply fresh and clean water to the photosensitive material 16 by exchanging water to be charged to the applying tray 78 every time when the printing operation is performed.

If the water-detecting sensor 298 detects the absence of water, then the photosensitive material 16 waits at the position in front of the applying tray 78 and the guide plate 80 (step 432). After that, an alarm is displayed in the same manner as the start-up of the image recording apparatus 10 (step 434). According to the alarm display, it is clarified that there is abnormality in the water supply system or the water discharge system between the bottle 234 and the applying tray 78 and the guide plate 80, which can be quickly dealt with as well in the same manner as the start-up of the image recording apparatus 10.

According to the method for supplying the image-forming solutions it is possible to always apply fresh and clean water to the photosensitive material 16 by exchanging water to be charged to the applying tray 78 every time when the printing operation is performed. Simultaneously, since previously temperature-raised water is supplied to the applying tray 78 and the guide plate 80, it is easy to obtain the predetermined temperature by heating water in the applying tray 78 and the guide plate 80. Thus a predetermined amount of water at a predetermined temperature is supplied in a short period of time, and thus the printing operation is not retarded.

It is noted that no water exists in the flow channel between the water supply pump 230 and the bottle 234 upon the start-up of the image recording apparatus 10, after exchange of the filter 232, and after exchange of the bottle 234. If the water supply pump 230 is operated in this state, then a large load is applied until arrival of water at the water supply pump 230. The load becomes small once water arrives at the water supply pump 230.

Thus it is preferable to adopt a method in which the motor 231 for driving the water supply pump 230 is constituted by a stepping motor to make an operation as follows. The motor 234 is driven at a low velocity by lowering the exciting frequency for the motor 231. during a period until water from the bottle 234 arrives at the water supply pump 230. After that, the motor 231 is driven at a high velocity by raising the exciting frequency. According to this method, a predetermined amount of supply can be supplied in a short period of time even by using a small motor without using a large motor as the motor 231. The cost is reduced as well.

Exchange of the filter 232 and exchange of the bottle 234 are performed by opening the front door 206. It is possible to detect states after exchange of the filter 232 and exchange of the bottle 234 by detecting a state in which the front door 206 is closed, on the basis of which the exciting frequency for the motor 31 can be controlled.

The procedure described above is effective in that a small motor is sufficient to be used for driving the water supply pump 231 in order not to retard the printing operation by supplying a predetermined amount of the image-forming solution at a predetermined temperature in a short period of time.

As for the numerical values in the embodiment described above, such as those for the operating time of the water supply pump 230 and the temperature of the applying section, it is a matter of course that the present invention is not limited to the numerical values referred to in the embodiment.

Next, the heating control for the image-forming solution will. be explained with reference to FIGS. 8 and 9.

Namely, the temperature in the vicinity of the water channel-formed area in the guide plate 80 (temperature of the applying section) is used as a factor for controlling the output of the heaters 260. The fact whether the apparatus is in an operating state in which the water supply pump 230 is operated or in a non-operating state in which the water supply pump 230 is not operated is also used as a factor for controlling the output of the heaters 260.

In the operating state of the water supply pump 230, the thermal toad is Large because water passes through the hollow channels 212 (liquid channel) in the guide plate 80. On the contrary, in the non-operating state of the water supply pump 230, the thermal load is reduced by an amount corresponding to the disappearance of passage of water through the hollow channels 212 in the guide plate 80. It is a matter of course that the output of the heaters 260 is made different depending on a difference in the temperature of the applying section between a detected value ( temperature detected by the temperature sensor 262) and a target value (40° C.) (the temperature is considerably lower than the target value, the temperature is close to the target value, and the temperature exceeds the target value). Additionally, the heaters 260 are controlled such that the output of the heaters 260 is increased in the operating state of the water supply pump, while the output of the heaters 260 is decreased in the non-operating state of the water supply pump 230 even in the case of an identical temperature in the vicinity of the water channel-formed area in the guide plate 80.

Accordingly, the temperature which is proper for application of water as the image-forming solution can be obtained efficiently in a short period of time. Moreover, the stability can be also realized.

In the non-operating state of the water supply pump 230, the fact whether or not water is present in the applying tray 78 is used as a factor to control the output of the heaters 260. Namely, the thermal load is large when water is present in the applying tray 78, while the thermal load is small when water is absent in the applying tray 78. If this factor is taken into consideration, more remarkable function and effect can be obtained. Namely, the heaters 260 are controlled such that the output of the heaters 260 is increased if water is present in the applying tray, while the output of the heaters 260 is decreased if water is absent in the applying tray 78, even in the case of an identical temperature in the vicinity of the water channel-formed area in the guide plate 80.

For example, FIG. 8 shows a control pattern in which the control condition is divided into four states including a state in which the water supply pump 260 is operated ( turned on), a state in which the water supply pump 260 is not operated (turned off) and water is present in the applying tray 78, a state in which the water supply pump 260 is not operated and water is absent in the applying tray 78, and a state in which the image recording apparatus is in start-up (namely upon start of operation of the heaters 260) three divisions in each of the states. Thus the heater power is made different respectively depending on the state and the temperature division to which the condition belongs. The thermal load becomes large in an order of the state in which the supply pump 260 is not operated and water is absent in the applying tray 78, the state in which the image recording apparatus is in start-up, the state in which the water supply pump 260 is not operated and water is present in the applying tray 78, and the state in which the water supply pump 260 is operated. Therefore, each of temperature divisions and outputs of the heaters corresponding to the temperature divisions are set in accordance therewith.

In this embodiment, the state in which the image recording apparatus is in start-up is also used as the factor to control the output of the heaters 260. By doing so, the effect is more remarkable in that the temperature which is proper for application of water as the image-forming solution can be obtained efficiently in a short period of time, and the stability can be also realized.

Figure 9:
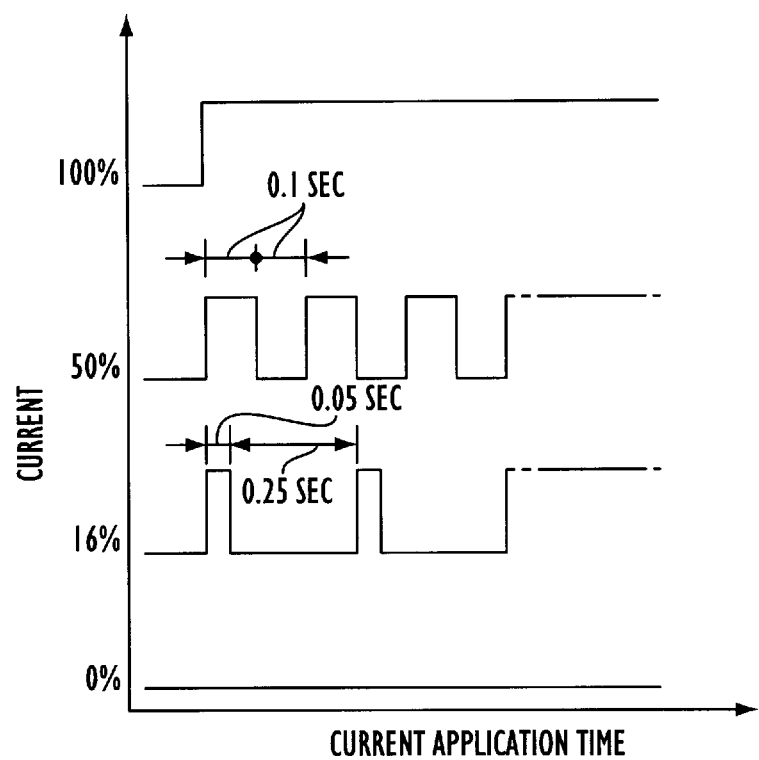
FIG. 9 is a time chart illustrating states of application of electric current to the heaters in relation to outputs of the heaters.
Figure 10:
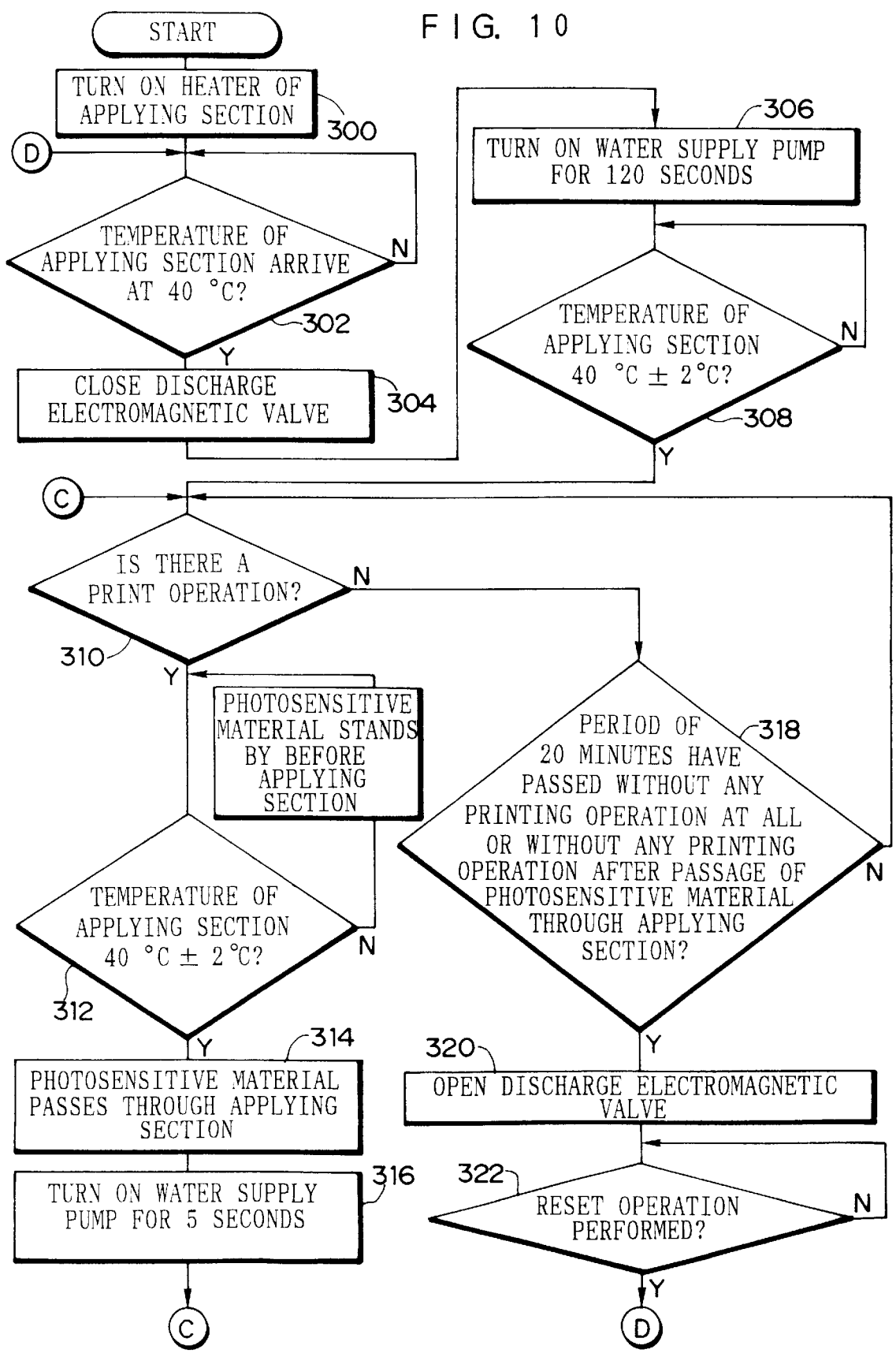
FIG. 10 shows a flow chart concerning the conventional method for supplying an image-forming solution and the heating control method.

Under the control as described above, the output of the heaters 260 is changed, for example, by a method as shown in FIG. 9. Namely, the control is achieved as follows. If the output of the heaters 260 is 100%, the current is always applied to the heaters 260. If the output of the heaters 260 is 0%, (current application to the heaters 260 is stopped. In the case of an intermediate output between 100% and 0%, the ratio of application time to non-application time for the current applied to the heaters 260 per unit time is appropriately set depending on a percentage (%) of the intermediate output, which is repeated.

As for the numerical values in the embodiment described above, such as those for the operating time of the water supply pump 230, the temperature of the applying section, and the numerical values concerning the control pattern as shown in FIG. 8, it is a matter of course that the present invention is not limited to the numerical values referred to in the embodiment.

What is claimed is:

1. A method for supplying an image-forming solution in which the image-forming solution is supplied to an applying section by using an image recording apparatus provided with the applying section for allowing an image-recording material to pass therethrough and applying the image-forming solution to the image-recording material, said method comprising the steps of:

heating the applying section;

supplying the image-forming solution from a supply container to the applying section by operating a supply pump during start-up of the image recording apparatus;

stopping the supply pump, opening a drainage valve, and discharging the image-forming solution to the supply container so that no image-forming solution remains in the applying section;

waiting for an image recording operation;

closing the drainage valve and operating the supply pump when the image recording operation is performed so that the applying section is charged with the image-forming solution each time an image recording operation is performed;

opening the drainage valve after passage of the image-recording material through the applying section so that the image-forming solution in the applying section is discharged to the supply container; and returning the image recording apparatus to a state in which no image-forming solution remains in the applying section.

2. The method for supplying the image-forming solution according to claim 1, further comprising the step of:

detecting, during the image recording operation, whether a predetermined amount of the image-forming solution is charged in the applying section after passage of a predetermined period of time after closure of the drainage valve.

3. The method for supplying the image-forming solution according to claim 2, wherein the photosensitive material is made to wait in front of the applying section if the applying section is charged with the image-forming solution in an amount less than the predetermined amount as detected by the detection.

4. the method for supplying the image-forming solution according to claim 1, further comprising the steps of:

providing a stepping motor as a motor for driving the supply pump;

providing a filter for filtrating the image-forming solution to be supplied to the applying section; driving the motor at a low velocity by lowering an exciting frequency of the motor until the image-forming solution arrives at the supply pump from the supply container, if the supply pump is operated during the start-up of the recording apparatus or after exchange of the filter or after exchange of the supply container; and driving the motor at a high velocity by raising the exciting frequency.

5. The method for supplying the image-forming solution according to claim 1, further comprising the steps of:

judging whether a temperature of the applying section is a predetermined temperature during the image recording operation; and causing the image-recording material. to wait before the applying section if the temperature of the applying section is not the predetermined temperature;

allowing the image-recording material to pass through the applying section if the temperature of the applying section is the predetermined temperature.

6. The method for supplying the image-forming solution according to claim 1, further comprising the steps of:

judging whether a temperature of the applying section is a predetermined temperature during the start-up of the image recording apparatus; and supplying the image-forming solution to the applying section if the temperature of the applying section is the predetermined temperature.

7. The method for supplying the image-forming solution according to claim 1, wherein the supply of the image-forming solution to the applying section during the start-up of the image recording apparatus is performed by closing the drainage valve after passage of a predetermined period of time after start of the supply.

8. The method for supplying the image-forming solution according to claim 7, further comprising the step of:

detecting whether a predetermined amount of the image-forming solution is changed in the applying section after passage of a predetermined period of time after closure of the drainage valve.

9. The method for supplying the image-forming solution according to claim 1, further comprising the step of:

judging whether the image recording operation is continuously performed before the image-forming solution in the applying section is discharged to the supply container by opening the drainage valve during the image recording operation.

10. The method for supplying the image-forming solution according to claim 9, wherein the supply pump is operated after passage of the photosensitive material through the applying section if it is judged in the judgment that the image recording operation is continuously performed.

11. A method for heating control for an image-forming solution by using an image recording apparatus, said apparatus comprising an image-forming solution-applying section provided with an applying tray to be charged with the image-forming solution for being an image-recording material to pass therethrough so that the image-forming solution is applied to the image-forming material, a guide member provided opposing to the applying tray for guiding and passing through the image-recording material to a space between the guide member and the applying tray, a liquid channel formed in the guide member, a supply pump for supplying the image-forming solution from a supply container to the applying tray through the liquid channel in the guide member, a heater provided on the guide member, a temperature sensor for detecting a temperature in the vicinity of a liquid channel-formed area in the guide member, and a drainage means for draining the image-forming solution from the applying tray to the supply container, and said method comprising the steps of:

judging an operating state of the supply pump, and detecting the temperature in the vicinity of the liquid channel-formed area formed in the guide member; and controlling an output of the heater on the basis of a judged state and a detected temperature.

12. The method for heating control for the image-forming solution according to claim 11, wherein the control is performed such that the output of the heater is controlled on the basis of the presence or absence of the image-forming solution in the applying tray in a non-operating state of the supply pump.

13. The method for heating control for the image-forming solution according to claim 11, wherein the control is performed such that current application time for the heater is controlled.

14. The method for heating control for the image-forming solution according to claim 13, wherein the control of the current application time for the heater is performed at every predetermined time.

15. A method for supplying an image-forming solution in which the image-forming solution is supplied to an applying section by using an image recording apparatus provided with the applying section for allowing an image-recording material to pass therethrough and applying the image-forming solution to the image-recording material, said method comprising the steps of:

heating the applying section;

supplying the image-forming solution from a supply container to the applying section by operating a supply pump during start-up of the image recording apparatus;

closing a drainage valve after passage of a predetermined period of time after start of the supply;

detecting whether a predetermined amount of the image-forming solution is charged in the applying section after passage of a predetermined period of time after closure of the drainage valve; and stopping the supply pump, opening the drainage valve, and discharging the image-forming solution to the supply container so that no image-forming solution remains in the applying section if it is detected that the image-forming solution is charged in the applying section;

waiting for an image recording operation;

closing the drainage valve and operating the supply pump when the image recording operation is performed so that the applying section is charged with the image-forming solution each time an image recording operation is performed;

detecting whether the applying section is charged with a predetermined amount of the image-forming solution after passage of a predetermined period of time after closure of the drainage valve;

allowing the image-recording material to pass through the applying section if it is detected that the image-forming solution is charged in the applying section, and opening the drainage valve so that the image-forming solution in the applying section is discharged to the supply container; and returning the imarge recording apparatus to a state in which no image-forming solution remains in the applying section.

16. The method for supplying the image-forming solution according to claim 15, wherein the photosensitive material is made to wait in front of the applying section if the applying section is charged with the image-forming solution in an amount Less than the predetermined amount as detected by the detection.

17. The method for supplying the image-forming solution according to claim 15, further comprising the steps of:

providing a stepping motor as a motor for driving the supply pump;

providing a filter for filtrating the image-forming solution to be supplied to the applying section;

driving the motor at a low velocity by lowering an exciting frequency of the motor until the image-forming solution arrives at the supply pump from the supply container, if the supply pump is operated during the start-up of the recording apparatus or exchange of the filter or after exchange of the supply container; and driving the motor at a high velocity by raising the exciting frequency.

18. The method for supplying the image-forming solution according to claim 15, further comprising the steps of:

judging whether a temperature of the applying section is a predetermined temperature during the image recording operation; and causing the image-recording material to wait before the applying section if the temperature of the applying section is not the predetermined temperature;

allowing the image-recording material to pass through the applying section if the temperature of the applying section is the predetermined temperature.

19. The method for supplying the image-forming solution according to claim 15, further comprising the steps of:

judging whether a temperature of the applying section is a predetermined temperature during the start-up of the image recording apparatus; and supplying the image-forming solution to the applying section if the temperature of the applying section is the predetermined temperature.

20. The method for supplying the image-forming solution according to claim 15, further comprising the step of:

judging whether the image recording operation is continuously performed before the image-forming solution in the applying section is discharged to the supply container by opening the drainage valve during the image recording operation; and operating the supply pump after passage of the photosensitive material through the applying section if it is judged that the image recording operation is continuously performed.

* * * * *